United States Patent [19]
Tabuchi et al.

[11] Patent Number: 5,172,307
[45] Date of Patent: Dec. 15, 1992

[54] ACTIVATED CARBON/POLYACENE COMPOSITE AND PROCESS FOR PRODUCING THE SAME

[75] Inventors: Junji Tabuchi; Takashi Saito; Atsushi Ochi; Yukari Shimizu, all of Tokyo, Japan

[73] Assignee: NEC Corporation, Japan

[21] Appl. No.: 845,855

[22] Filed: Mar. 3, 1992

Related U.S. Application Data

[63] Continuation of Ser. No. 674,675, Mar. 25, 1991, abandoned.

[30] Foreign Application Priority Data

| Mar. 23, 1990 | [JP] | Japan | 2-72208 |
| Apr. 25, 1990 | [JP] | Japan | 2-107431 |
| Sep. 21, 1990 | [JP] | Japan | 2-249961 |
| Sep. 21, 1990 | [JP] | Japan | 2-249970 |
| Oct. 5, 1990 | [JP] | Japan | 2-266498 |
| Oct. 5, 1990 | [JP] | Japan | 2-266499 |

[51] Int. Cl.$^5$ .......................... H01G 9/00; C09C 1/56
[52] U.S. Cl. .................. 361/502; 29/25.03; 423/447.1
[58] Field of Search ............ 361/502; 264/292; 423/447.1, 447.6; 29/25.03

[56] References Cited

U.S. PATENT DOCUMENTS

| 4,542,444 | 9/1985 | Boland | 361/502 |
| 4,626,964 | 12/1986 | Azuma et al. | 361/502 |
| 4,737,889 | 4/1988 | Nishino et al. | 361/502 |
| 4,921,686 | 5/1990 | Yoshida et al. | 423/447.6 |

*Primary Examiner*—Donald Griffin

[57] ABSTRACT

An activated carbon/polyacene composite is disclosed. The composite contains activated carbon powder or fiber and having a selected molar ratio range of hydrogen atoms [H] to carbon atoms [C] of $0.01 \leq [H]/[C] \leq 0.2$. It provides two or more times the capacitance per unit volume, and enables reduction of the equivalent series resistance of an electric double-layer capacitor without compression. It therefore is a suitable composite for use as polarizable electrodes for electric double-layer capacitors. The composite can be made by mixing activated carbon powder or fiber and a thermosetting resin powder such as phenolin resin powder, and subjecting the mixture to heat treatment in a nonoxidizing atmosphere at temperatures between 600° and 1000° C. which is insufficient to reach full carbonization of the thermosetting resin.

17 Claims, 4 Drawing Sheets

FIG. 7a
FIG. 7b
FIG. 8
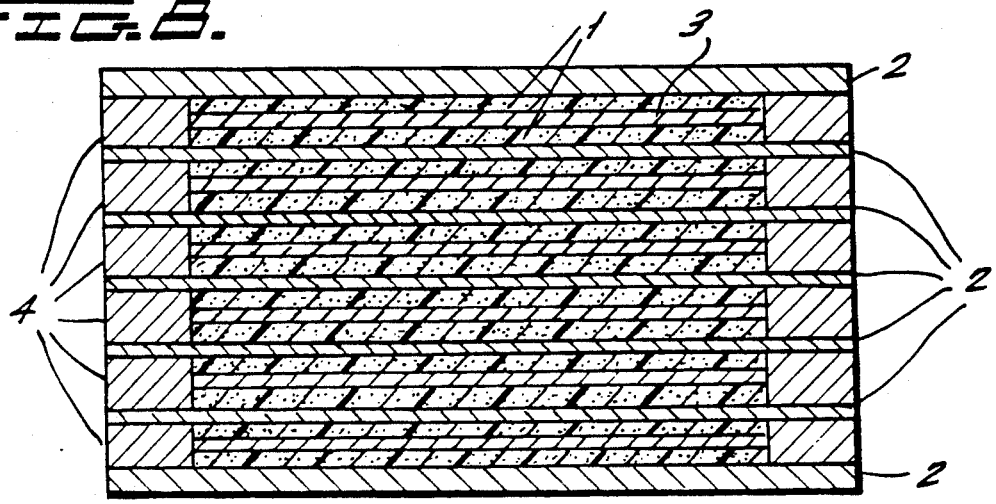
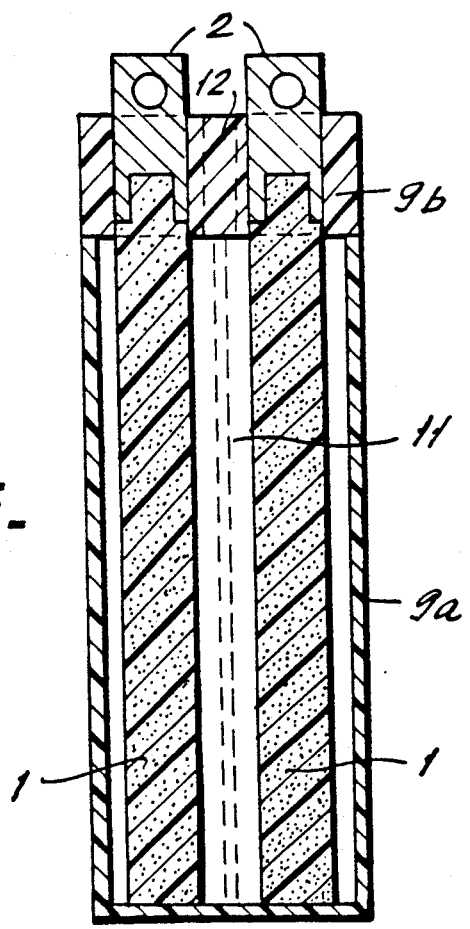
FIG. 6

ACTIVATED CARBON/POLYACENE COMPOSITE AND PROCESS FOR PRODUCING THE SAME

This is a continuation of application Ser. No. 07/674,675, filed on Mar. 25, 1991 and now abandoned.

FIELD OF THE INVENTION

This invention relates to polarizable electrode material for use in an electric double-layer capacitor or cell and to a process for producing the same.

Electric double-layer capacitors are widely used as a type having small size and large capacitance, as a backup for micro computer memories, or the like, an auxiliary power source for instantaneous supply of large electric current, and so on.

FIG. 1 is a schematic illustration of a structural element or cell of a general electric double-layer capacitor (referred to as capacitor element or element hereinafter). A pair of polarizable electrodes 1 impregnated with an electrolytic solution are arranged on the opposite sides of a porous, nonconducting and pervious-to-ion separator 3 defined by top and bottom collector plates 2 conducting and impervious-to-ion and sealed at the sides with gaskets 4 which serves to hold the shape of the electrode. To such a capacitor element, voltages over the electrolytic voltage of the electrolytic solution can not be applied. To make an intended electric double-layer capacitor therefore the desired number of such capacitor elements are laminated according to the voltage to be used. In the prior art, polarizable electrode 1 has been used which is made by molding activated carbon powder or fiber with bonding agent such as fluorine-contained resin or artificial latex.

It has become a very important factor for the realization of smaller size and inexpensive electric double-layer capacitors to increase its capacitance and simplify the manufacturing process thereof. In addition, it is important for reducing the equivalent series resistance of the electric double-layer capacitor to lower the intrinsic resistances of the capacitor components. In particular, large-capacitance electric double-layer capacitors of above 10 F in capacitance are used in many cases for instantaneous current supply. For this reason, the equivalent series resistance is needed to be as small as possible. The equivalent series resistance of an electric double-layer capacitor is the sum of resistances of the polarizable electrode, collector, connection conductors, terminal electrodes, and electrodes, and contact resistances between them, and each value takes up substantially even rate of the equivalent series resistance.

Previously, the element of the electric double-layer capacitor has been required to be compressed because, unless this was done, activated carbon powder or fiber therein retained a small bulk density and poor conductivity. For the miniaturization of the electric double-layer capacitor therefore it has been desired to develop electrode material having improved packing density, large capacitance per unit volume, good conductivity and thus useful without needing compression.

In recent years, since miniaturization of electronic components has been highly required, it is necessary to make the size of electric double-layer capacitors smaller and hence to develop improved molding methods of small size electrodes as well as electrode material having higher packing density and larger capacitance per unit volume. For these purposes, methods of molding activated carbon powder with a conducting substance as a bonding agent have been proposed. For instance, as disclosed in Japanese Patent Laid-open Application No. Sho. 63-226019, a mixture of activated carbon powder or fiber and resol type phenol resin is carbonized by thermal treatment in a non-oxidizing atmosphere. However, full carbonization of the phenol resin, as is effective as bonding agent however, produces carbon making no contribution to creation of additional capacitance of the polarizable electrode.

On the other hand, polyacenic materials are, as disclosed in Japanese Patent Laid-open Application No. SHO. 58-136649, useful material made from thermosetting resin such as phenol-aldehyde resin by heat treatment in a non-oxidizing atmosphere. Ion doping into polyacenic material is possible, which thereby become an active substance for cells. Synthesis of polyacene from a thermosetting resin can be carried out at low treatment temperatures, and thus it is considered that polyacenic materials are products resulting from imperfect carbonization of the thermosetting resin, that is, on the way of carbonization. They are precursors of carbon containing considerable amounts of oxygen and hydrogen in composition, and thus have been clearly distinguished from carbon itself.

As described above, some inventions of polarizable material for electric double-layer capacitor have been made aiming at improving capacitance. Increase of the specific surface only by using polyacenic material is limited. The problem has been encountered in the cell that internal resistance which is one characteristic of it was large as the result the associated doping and undoping as compared with the electric double-layer capacitor. Another problem was that carbon produced when activated carbon powder was bonded together was not useful as an electrode.

Moreover there are problems, in an electric double-layer capacitor utilizing thick activated carbon/polyacene composite film according to the present invention as polarizable electrode, with connector connection, sealing, and further manufacturing process aiming at mass production as electronic components which remains to be proposed.

SUMMARY OF THE INVENTION

A principal object of the present invention is to provide a small-sized large-capacitance electric double-layer capacitor comprising polarizable electrodes of an activated carbon/polyacene composite, and thereby capable of performing rapid charging and discharging, and having an improved packing density associated with the use of polyacene substance, and utilizing a part of the added polyacene as additional capacitance.

The present invention is characterized by an activated carbon/polyacene composite made by heat treatment of a mixture of activated carbon powder or fiber and a thermosetting resin powder in a non-oxidizing atmosphere, thereby the thermosetting resin being converted into a polyacene, and a process of preparing them.

The present invention is further characterized by an electric double-layer capacitor which utilizes the above-mentioned activated carbon/polyacene composite as a polarizable electrode, having such a structure that a pair of such polarizable electrodes is opposed with a non-conducting, pervious-to-ion separator sandwiched between them, and a collector of conducting carbon or ceramic is fixedly connected to the polarizable electrodes with a conducting coating, by means of fit-in structure, or by heat-fusion when a carbon-containing rubber is used as the collector material.

The present invention is further characterized by a process for manufacturing at least one electric double-layer capacitor which utilizes a thick activated carbon/polyacene composite as polarizable electrode, comprising forming at least one pattern to be polarizable electrode on a conducting substrate, adhering hermetically a gasket to the substrate, the gasket having holes cut corresponding to those patterns on the substrate, adhering hermetically the substrates and the gasket so that individual polarizable electrodes having the same pattern are opposed to each other, and then cutting the resulting assembly into sections.

The present invention is further characterized by a process of manufacturing at least one polarizable electrode for the electric double-layer capacitor which utilizes a metal substrate having thick activated carbon/polyacene composite film integrated therewith, the metal substrate having film being made by bringing a paste mixture of activated carbon powder, granular or powdery phenole-aldehyde resin and solvent such as methyle collosolve in the form of film on a metal substrate by the screen printing, and then subjecting the film to heat-hardening, followed by heat treatment in non-oxidizing atmosphere, characterized in that the peripheral portion of a the substrate is clinched hermetically through the intermediation of gasket, and at least one pattern to be polarizable electrode is formed by screen printing, and subjected heat treatment at a time.

BRIEF DESCRIPTION OF THE DRAWINGS

FIG. 6 is a cross-sectional view of the electric double-layer capacitors described in Example 10;

FIGS. 7A and 7B are cross-sectional views of a thick activated carbon/polyacene composite film on carbon substrate and sheet, respectively, described in Example 14;

FIG. 8 is a cross-sectional view illustrating main construction of an electric double-layer capacitor described in Example 14;

DESCRIPTION OF THE PREFERRED EMBODIMENTS

Figure 1:
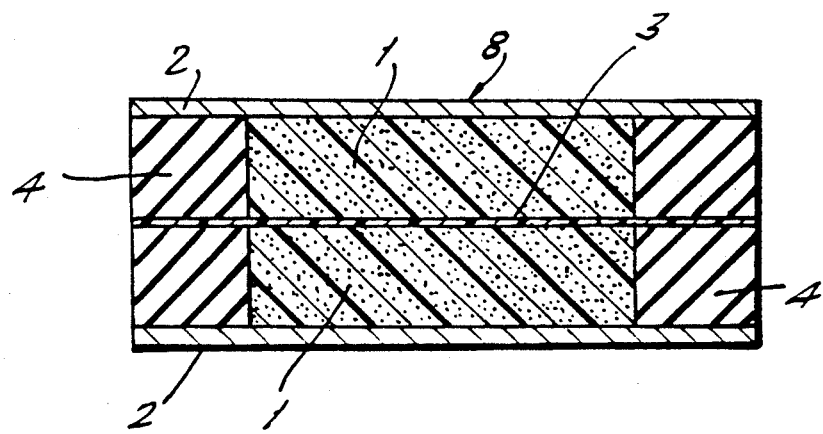
FIG. 1 is a cross-sectional view of a prior art electric double-layer capacitor.

The present invention will be described by way of examples hereinafter:

EXAMPLE 1

Phenolic activated carbon powder (specific surface area 1200 m$^2$/g) and phenolic resin powder were dry-mixed by a ball mill in various mixing ratios given in Table 1. The phenolic resin used here was granular or powdery phenole-formaldehyde resin produced by Kanebo Ltd., under the product name of "BELL-PEARL-S890". Its specific feature is described in the U.S. Pat. No. 4,454,298 issued on Jun. 12, 1984. The powder mixture was molded in a mold at 150° C. and at a pressure of 100 Kg/cm$^2$ for 15 minutes, cut into pieces of 35×10×2 mm$^3$ in size, and subjected to heat treatment in a N$_2$ atmosphere in an electric furnace at various temperatures given in Table 1 for 2 hours, respectively. The obtained activated carbon/polyacene composite underwent elementary analysis and then its ratio of hydrogen atom [H] to carbon atom [C]: [H]/[C] was determined. These results together with the resistivities determined by the DC 4-terminal method are shown in Table 1. Subsequently two sheets of the obtained activated carbon/polyacene composite were impregnated in vacuo with an electrolytic solution of 30 wt % sulfuric acid solution for 5 to 8 hours. Each of a pair of the resulting polarization electrodes were covered at the upper end thereof with a gold foil, clipped with a metallic clip, a lead wire being attached thereto, and placed in a beaker containing 30 wt % sulfuric acid to be opposed to each other at a distance of 3 cm. Thus a specimen of single cell electric double-layer capacitor was assembled. A constant voltage of 900 mV was applied between the electrodes of this single cell electric double-layer capacitor for one hour to charge it. Subsequently while discharging at a constant electric current of 10 mA, time it takes for the voltage to fall from 540 mV to 450 mV was measured, from which the capacitance of this single cell electric double-layer capacitor was determined. For standardization of capacitance, the capacitances per unit volume obtained by division of the value of the capacitance by the appearing volume of the two electrodes are shown in Table 1. In addition a constant current of 10 mA and 1 KHz is allowed to flow through this electric double-layer capacitor, and during which the voltage appearing between the ends thereof was measured, from which the equivalent series resistance (ESR) was determined.

As apparent from Table 1, as treatment temperature becomes higher, the resistivity of the electrode material becomes smaller, and the equivalent series resistance of the electric double-layer capacitor has smaller value. On the other hand, the capacitance per unit volume reaches a peak at a certain heat treatment temperature because at low temperatures, activated carbon powder has higher resastance and hence contributes poorly to the electric double-layer capacitance while at higher temperatures, polyacene substance serving as a bonding agent for activated carbon powder becomes carbonized and thus is unuseful as polarizable material. At present, what mechanism of action by which polyacene substance contributes to the electric double-layer capacitance remained still unclarified. With regard to this example, it may be considered that hydrogen ions and sulfuric ions in the sulfuric acid solution are doped/undoped into/from the polyacene part of the electric double-layer capacitor/polyacene composite.

TABLE 1

| No. | Mixing ratio (wt %) Active carbon | Resin | Heat treatment temperature °C. | [H]/[C] | Resistivity Ω·cm | Capacitor characteristic Capacitance F/cm³ | ESR Ω |
| --- | --- | --- | --- | --- | --- | --- | --- |
| 1  | 30 | 70 | 700  | 0.070 | 0.424  | 2.14 | 6.53 |
| 2  | 30 | 70 | 800  | 0.053 | 0.0741 | 1.86 | 1.87 |
| 3  | 30 | 70 | 900  | 0.035 | 0.0167 | 0.48 | 1.88 |
| 4  | 30 | 70 | 1000 | 0.022 | 0.0086 | 0.56 | 1.28 |
| 5  | 50 | 50 | 700  | 0.086 | 0.1892 | 21.4 | 2.18 |
| 6  | 50 | 50 | 800  | 0.061 | 0.0515 | 13.5 | 1.34 |
| 7  | 50 | 50 | 900  | 0.038 | 0.0282 | 13.0 | 1.10 |
| 8  | 50 | 50 | 1000 | 0.027 | 0.0143 | 7.7  | 1.15 |
| 9  | 60 | 40 | 600  | 0.151 | 0.576  | 24.4 | 9.3  |
| 10 | 60 | 40 | 700  | 0.103 | 0.166  | 39.1 | 1.99 |
| 11 | 60 | 40 | 800  | 0.059 | 0.0545 | 44.9 | 1.24 |
| 12 | 60 | 40 | 900  | 0.021 | 0.0228 | 33.1 | 1.05 |
| 13 | 60 | 40 | 1000 | 0.019 | 0.0155 | 30.2 | 1.17 |
| 14 | 70 | 30 | 600  | 0.196 | 1.365  | 36.7 | 11.6 |
| 15 | 70 | 30 | 700  | 0.136 | 0.203  | 43.2 | 2.51 |
| 16 | 70 | 30 | 800  | 0.088 | 0.109  | 47.0 | 1.40 |

EXAMPLE 2

Phenolic activated carbon fiber (specific surface area 2000 m²/g) 10 g was impregnated with a water-soluble phenolic resin solution which was obtained by dissolving the phenolic resin powder 10 g of Example 1 into methylcellsolve 8 g, and then hardened at 120° C. The resultant activated carbon fiber/phenolic resin composite was subjected to heat treatment at 800° C. in nitrogen atmosphere in an electric furnace for two hours. The temperature-rising rate was 10° C./h. Elementary analysis gave a result of [H]/[C] ratio 0.057. The cut-out activated carbon/polyacene composite sheets (20×10×1 mm³) were impregnated in vacuo with a 30 wt % sulfuric acid solution, and a single cell electric double-layer capacitor was assembled in the same way as in Example 1. The electric double-layer capacitance per unit volume of this material was 18.2 F/cm³ and the equivalent series resistance was 1.4Ω as determined in the same way as in Example 1.

REFERENCE 1

An electric double-layer capacitor was made with the same conventional phenolic activated carbon powder as used in Example 1 which has a specific surface area of 1200 m²/g. The activated carbon powder was mixed with a 40 wt % sulfuric acid solution into paste. An insulating rubber of 0.5 mm thick provided with a hole of 30 mm in diameter and a 0.2 mm thick conducting rubber were firmly put on together, and the hole was filled with the paste to make a polarizable electrode. A polyethylene separator 0.1 mm thick cut out to a size of 32 mm in diameter was sandwiched concentrically between a pair of the polarization electrodes. Then the resultant was compressed at a pressure of 30 Kg/cm², and the capacitance and equivalent series resistance of the electric double-layer capacitor under this conditions were determined. Procedure for capacitance was the same way as in Example 1: a constant voltage of 900 mV was applied between the ends of this single cell electric double-layer capacitor for one hour to change it. Subsequently while discharging at a constant electric current of 10 mA, time it takes for the voltage to fall from 540 mV to 450 mV was measured, from which the capacitance was determined. The thickness of the rubber under pressure and the volume the activated carbon paste takes were measured. The volume of the activated carbon powder was determined from the mixing ratio of activated carbon powder to sulfuric acid. The measured capacitance was divided by the volume of the activated carbon powder to obtain a capacitance per unit volume of 26 F/cm³. The equivalent series resistance was 0.4Ω.

Comparison between Reference 1 and Examples, though can not exactly conducted because of the difference in distance between electrodes, it should be noticed that the capacitance in Reference 1 can be only achieved under the condition of high pressure such as 30 Kg/cm². In contrast, according to the present invention, a desired capacitance can be obtained without any pressure. To this end, a casing structure for the electric double-layer capacitor can be simplified.

By referring the capacitor characteristic in Table 1, the feature of the activated carbon/polyacene composite of these examples can be explained such that its capacitance per unit volume shows 0.40 F/cm³ or more and its equivalent series resistance shows 12Ω or less under the condition of no compression. In such a condition, its resistivity shows 1.365 Ω·cm or less while the ratio of the [H]/[C] shows the range of 0.01 to 0.2. When the value of the [H]/[C] is less than 0.01, the composite is fully carbonized and thus the polyacene portion in the composite does not contribute to its capacitance. When the value of the [H]/[C] exceeds 0.2, the phenolic resin is not changed to polyacene totally, and results in low conductivity and polyacene portion in the composite does not effectively work for the capacitance. Preferably, the mixed ratio of the activated carbon and the resin is selected to be 50/50 to 70/30 by weight as shown in Table 1. In those condition, its capacitance per unit volume becomes 7.7 F/cm³ or more without any pressure. More preferably, its heat treatment temperature should be selected in the range of 700° C. to 900° C. In this condition, its capacitance per unit volume increases to 13.0 F/cm³ or more and its equivalent series resistance decreases to 2.51Ω or less and its resistivity becomes 0.21 Ω·cm or less while the ratio of the [H]/[C] shows the range of 0.02 to 0.14.

Accordingly, the activated carbon/polyacene composite of the Table 1 can be featurized that the resistivity is 1.4 Ω·cm or less while the ratio of the [H]/[C] is in the range of 0.01 to 0.2, and preferably the resistivity is 0.21 Ω·cm or less while the ratio of the [H]/[C] is in the range of 0.02 to 0.14.

As for the granular or powdery phenol-formaldehyde resin, which is a condensation product of a phenol and a formaldehyde and optionally a nitrogen-containing compound having at least two active hydrogens. This granular or powdery resin is characterized by containing spherical primary particles and secondary particles resulting from the agglomeration of the primary particles. Each of the particles has a particle diameter of 0.1 to 150 microns, and at least 50% by weight thereof can pass through a 100 Tyler mesh sieve.

By using this special resin powder, the activated carbon powder can be uniformly mixed with the phenol-formaldehyde resin. Moreover, since this resin has larger degree of polymerization compaired with a conventional resol-type phenolic resin and contains methylol group, a large sized thermosetting material containing activated carbon can be obtained.

EXAMPLE 3

Figure 2:
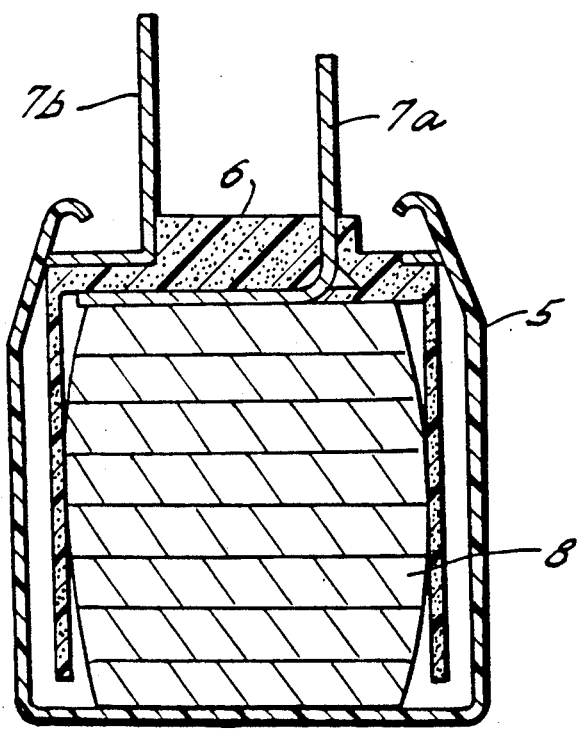
FIG. 2 is a cross-sectional view of a prior art multi-cell electric double-layer capacitor incorporating eight capacitor elements fixedly connected in series.

Phenolic activated carbon powder (specific surface area 1200 m$^2$/g) and phenolic resin powder were dry-mixed by a ball mill in a mixing ratio of 60/40 by weight. The powder mixture was molded into discs (8.5 mm in diameter, 1 mm thick) through a injection molding machine, and then subjected to heat treatment at 800° C. in nitrogen atmosphere. The temperature-rising rate was 10° C./h. Thus an activated carbon/polyacene composite was obtained which become 7% isotropically-reduced to a size of 7.9 mm in diameter and 0.93 mm thick. The obtained activated carbon/polyacene composite was immersed in an electrolytic solution of 40 wt % sulfuric acid solution in vacuo for 5 hours to be impregnated. The thus-obtained polarizable electrode 1 was fitted in a recess in an integrated combination of a collector 2 and a gasket 4 pressed on the former. An unvulcanized conducting butyl rubber of 200 μm thick and 12.8 mm in diameter was used so the collector 2, and an unvulcanized butyl rubber of 1 mm thick and 12.8 mm in diameter provided with a concentric hole of 8.0 mm in diameter as the gasket 4. A pair of the resultant assembly were pressed together, with the respective polarization electrodes opposed to sandwich a separator between them. The pressing together was carried out under the vulcanization by allowing them to stand at 120° C. at a pressure of 7 Kg/cm$^2$ for 3 hours. Thus a capacitor cell unit was obtained. A separator 3 was of polyethylene, porous, and 100 um thick. As illustrated in FIG. 2, six capacitor cell units 8 were laminated, and accommodated in an insulating cover 6 with skirt and a metallic casing 5. Then the upper edge of the metallic casing 5 was clinched for sealing. A pair of electrode terminals 7 and 7' extend out. Thus an electric double-layer capacitor of operating voltage 5 V was obtained.

Characteristics of the electric double-layer capacitor obtained in this Example: electrostatic capacitance, equivalent series resistance and leak current were determined. Electrostatic capacitance was calculated out from the time constant which was measured by application of a constant voltage of 5 V with a 1 KΩ resistance connected in series to the electric double-layer capacitor. For determination of equivalent series resistance, the voltage between the terminals of the electric double-layer capacitor was measured at a constant current of 10 mA and 1 kHz. Electrostatic capacitance and equivalent series resistance of the electric double-layer capacitor of this Example were 0.304 F and 4.2Ω, respectively.

EXAMPLE 4

Figure 3:
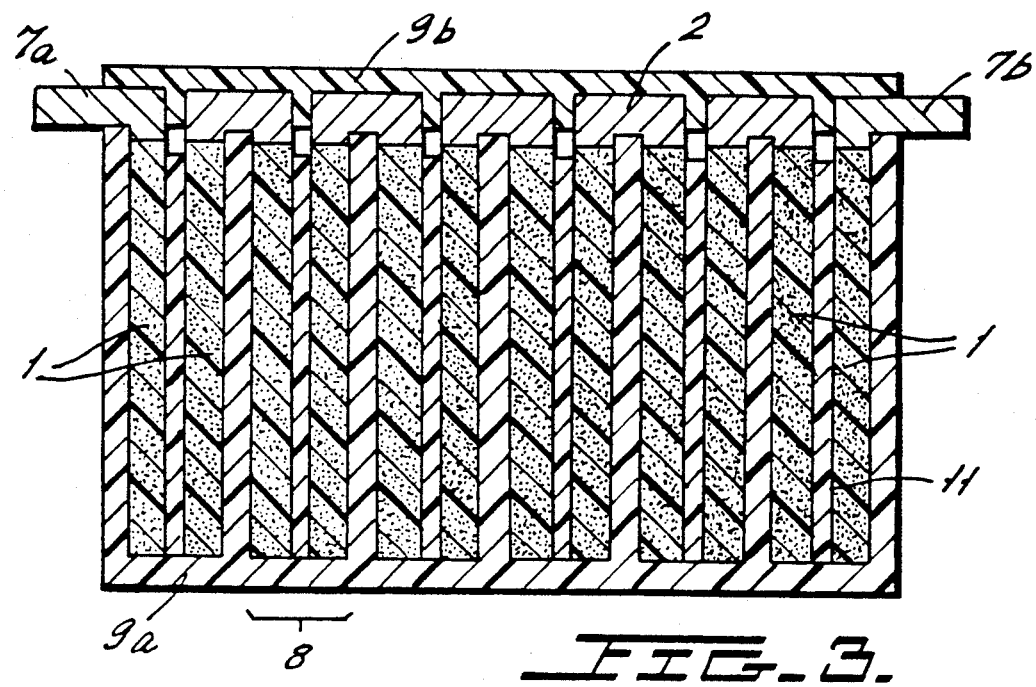
FIG. 3 is a cross-sectional view of a multi-cell electric double-layer capacitor involving Examples 4 through 9.
Figure 4:
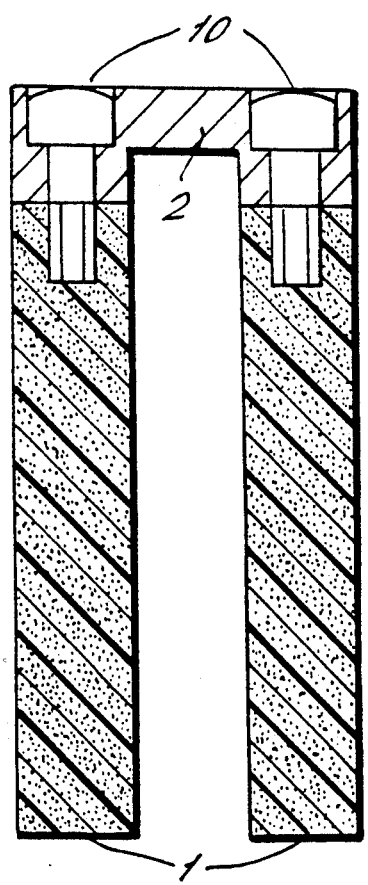
FIG. 4 is a cross-sectional view of a polarizable electrode and a collector of the electric double-layer capacitor described in Example 4, for illustrating the connection between them.

Phenolic activated carbon powder and phenolic resin powder for Example 1 were dry-mixed by a ball mill in a mixing ratio of 60/40 by weight. The powder mixture was molded in a mold at 150° C. at a 100 Kg/cm$^2$ for 15 minutes to obtain an activated carbon-containing phenolic resin plate of a size 100×70×6 mm$^3$. This plate underwent heat treatment at 800° C. in nitrogen atmosphere in an electric furnace for 2 hours. The temperature-rising rate was 10° C./h. Thus an activated carbon/polyacene composite was obtained which had a specific surface of 950 m$^2$/g as determined by BET measurement based on nitrogen adsorption. Referring to FIG. 4, a pair of porous carbon blocks to be polarizable electrodes 1 were machined to cut a tapped hole of M2 on the surface thereof, followed by impregnation in a 41 wt % sulfuric acid solution, and then assembled to make electric connection through an M2 carbon screw to a carbon collector 2. Herein a pair of polarization electrodes opposed to hold the electrolytic solution between them constitutes a capacitor cell unit 8 of electric double-layer capacitor. An electric double-layer capacitor of a rated voltage 5.5 V was made by arranging, as illustrated in FIG. 3, six capacitor cell units 8 (five assemblies shown in FIG. 4 consisting of two polarizable electrodes plus one collector and two assemblies consisting of one polarizable electrode plus one collector) connected in series and accommodating them in a 6-chamber polyvinyl chloride vessel 9a. Each chamber is provided with a partition 11 standing erect on the bottom for preventing short circuit between the opposed polarization electrodes. For preventing electrolytic solution from leaking out of the vessel, the vessel was sealed with a lid 9b. The external dimensions of the electric double-layer capacitor were 10×7×9 cm$^3$.

EXAMPLE 5

Figure 5:
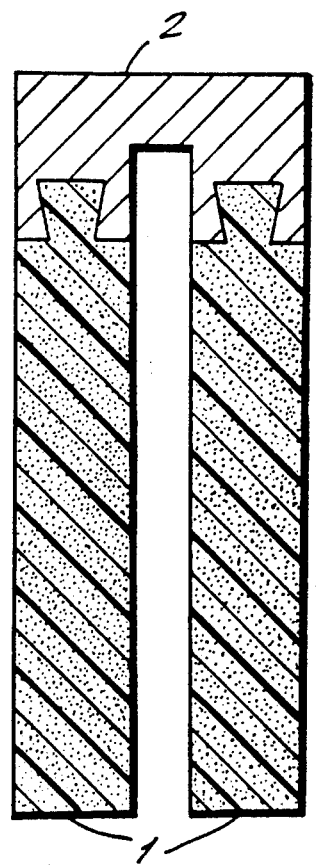
FIG. 5 is a cross-sectional view of a polarizable electrode and a collector of the electric double-layer capacitors described in Examples 5 and 6, for illustrating the connection between them.

Polarization electrodes 1 of the same porous carbon block as in Example 4 were made, and each was machined to form a flaring tenon on the upper surface thereof. On the other hand, each carbon collector 2 was machined to form a fitting mortise. The tenon was coated with a carbon paste adhesive and then fitted in and adhered to the mortise to make electrical connection between the polarization electrodes 1 and the collector 2 as shown in FIG. 5. The polarization electrodes were impregnated with a 41 wt % sulfuric acid solution in vacuo. Then an electric double-layer capacitor of a rated voltage 5.5 V was made which consists, as illustrated in FIG. 3, of six capacitor elements 8 connected in series and a separately-made polyvinyl chloride vessel 9a containing them. The configuration and sealing of the vessel, and external-connection terminals were the same as in Example 4.

EXAMPLE 6

The same polarizable electrodes as in Example 4 of thermoset product from active carbon and phenolic resin, each carbon electrode 1 having the same shape as shown in FIG. 5 with a tenon on the upper surface thereof, were made using a mold with the corresponding recess by carbonization at 800° C. in nitrogen atmosphere in an electric furnace. The temperature-rising rate was 5° C./h. The resulting polarizable electrodes 1 were impregnated with an electrolytic solution of 41 wt % sulfuric acid solution in vacuo, and each was integrated with a carbon collector 2 machined to have a mortise in which the tenon of the electrode was fitted in. Thus electric connection between both was made. Subsequently an electric doublelayer capacitor of a rated voltage 5.5 V was assembled which consists, as illustrated in FIG. 3, of six capacitor elements 8 connected in series and a separately-made polyvinyl chloride vessel 9a containing them. The configuration and sealing of the vessel, and external-connection terminals were the same as in Example 4.

EXAMPLE 7

The same polarization electrodes 1 as in Example 4 were made. Onto the back of a pair of such polarizable electrodes 1, a conducting carbon-containing rubber to be a collector 2 was fused at 180° C. under pressure to make electric connection between both. The resulting polarization electrodes 1 were impregnated with an electrolytic solution of 41 wt % sulfuric acid in vacuo. Five elements and two modified elements assembled of one polarizable electrode and one collector (such as 7a) similarly fused together were arranged as shown in FIG. 3, thus an electric double-layer capacitor of a rated voltage 5.5 V containing six capacitor elements 8 connected in series being made. The configuration and sealing of the vessel, and external connection terminals were the same as in Example 4.

EXAMPLE 8

The same polarizable electrodes 1 as in Example 4 were made. Onto the back of a pair of such polarizable electrodes 1, a conducting carbon-containing plastic film to be a collector 2 was fused at 180° C. under pressure to make electric connection between both. The resulting polarizable electrodes 1 were impregnated with an electrolytic solution of 41 wt % sulfuric acid in vacuo. Five elements and two modified elements assembled of one polarizable electrode and one collector (such as 7a) similarly fused together were arranged as shown in FIG. 3, thus an electric double-layer capacitor of a rated voltage 5.5 V containing six capacitor elements 8 connected in series being made. The configuration and sealing of the vessel, and external-connection terminals were the same as in Example 4.

EXAMPLE 9

Activated carbon powder and phenolic resin powder of Example 1 were dry-mixed by a ball mill in a mixing ratio of 60/40 wt/wt for 72 hours. The powder mixture was molded by heat press at 180° for 10 minutes into a size of 100 mm×70 mm×6 mm. The molded product was subjected to heat treatment at 800° C. in non-oxidizing atmosphere to obtain an activated carbon/polyacene composite as polarizable electrode 1 shown in FIG. 3. The polarizable electrode 1 was adhered with a conducting adhesive to a terminal electrode 7a or 7b of a conducting ceramic $ZrB_2$ and a collector 2 to make electrical connecting between these. The assembly was immersed in an electrolytic solution of 30 wt % sulfuric acid solution in vacuo to impregnate the polarization electrode with the solution. The terminal electrodes 7a, 7b, the collector 2 and electrolyte-impregnated polarizable electrodes 1 were placed in a polyvinyl chloride vessel 9a which was supplemented with the electrolytic solution to fullness. Then a polyvinyl chloride lid 9b was adhered to seal the vessel 9a. Thus an electric double-layer capacitor of an operating voltage 5.5 V according to the present invention as shown in FIG. 3.

Moreover there are compounds considered to have the same effect as in Examples in view of specific resistance of up to 1 mΩ·cm, crystal structure, and lattice constant, and these includes borides such as $ZrB$, $CrB_2$, $HfB_2$, $MoB_2$, $ScB_2$, $TaB_2$, $TiB_2$, $VB_2$, $CrB$, $CrB_4$, $LaB_4$, $Mo_2B_5$, $NbB$, $TaB$, $VB$, $V_3B_2$, $W_2B_5$, $YB_4$, and $ZrB_{12}$, carbides such as $HfC$, $NbC$, $TaC$, $VC$, $ZrC$, $V_2C$, $Cr_3C_2$, $Co_3C$, $MoC$, $Mo_2C$, $WC$, and $W_2C$, and nitrides such as $CrN$, $LaN$, $NbN$, $VN$, $YN$, $ZrN$, $Nb_2N$, $TaN$, and $Ta_2N$.

As described above, the use of conductive ceramics such as borates, carbonates or nitrides as the collector 2 and electrodes 7a and 7b has proved to be much effective for reducing the equivalent series resistance of the electric double-layer capacitor.

Of six electrid double-layer capacitors made in Examples 4 through 9, electrostatic capacitances and equivalent series resistances were determined. For determining the electrostatic capacitance of a capacitor, it was charged at a constant voltage of 5 V for 24 hours. While discharging at a constant current of 10 mA, time it took for the voltage to fall from 3 V to 2.5 V was measured. From this measured value the electrostatic capacitance was calculated out by the following equation:

$$C = \frac{1 \times t}{\Delta V} \quad (1)$$

where C is electrostatic capacitance (F), I is $(10 \times 10_{-3} A)$, t is time it takes for voltage to fall from 3 V to 2.5 V (sec), and $\Delta V$ is difference in voltage (0.5 V). The equivalent series resistance of an electric double-layer capacitor was obtained by, measuring the voltage between the terminals at an alternating current of 1 KHz, 10 mA applied therebetween. The yields results of electrostatic capacitance and equivalent series resistance are summarized in Table 2.

TABLE 2

|  | Electrostatic capacitance (F) | Equivalent series resistance (Ω) |
| --- | --- | --- |
| Example 4 | 471 | 6.2 |
| Example 5 | 463 | 1.2 |
| Example 6 | 468 | 1.5 |
| Example 7 | 475 | 3.7 |
| Example 8 | 472 | 5.8 |
| Example 9 | 447 | 0.5 |

EXAMPLE 10

Phenolic activated carbon powder and phenolic resin powder of Example 1 were dry-mixed by a ball mill in a mixing ratio of 60/40 by weight. The powder mixture was molded in a mold at 150° C. at a 100 Kg/cm² for 15 minutes to obtain an activated carbon-containing phenolic resin plate of a size $100 \times 70 \times 6$ mm³. This plate was placed in an electric furnace and subjected to heat treatment at 800° C. in nitrogen atmosphere for 2 hours. The temperature-rising rate was 10° C./h. Thus an activated carbon/polyacene composite was obtained which had a specific surface are of 950 mm²/g as determined by BET measurement based on nitrogen adsorption.

Referring to FIG. 6, the connection of the polarizable electrodes 1 and a carbon collector 2 and sealing will be described under. In this Example, the collector 2 serves as terminal electrode as well. Each porous carbon blocks to be polarizable electrodes 1 was machined to form a tenon on the upper surface thereof. On the other hand, each carbon collector and concurrently terminal electrode 2 was machined to form a fitting mortise. The tenon was coated with a carbon paste adhesive and then fitted in and adhered to the mortise to make electrical connection between the polarizable electrodes 1 and the collector and concurrently terminal electrode 2.

Two sheets of such collector/polarizable electrodes assembly were placed in a mold, and then injection molding was carried out with an injection molding machine (injection pressure: 25 tonnages). The mold used was a one-per-each mold. Besides in view of obtaining resin-sealed assembly of collector and polarizable electrodes, this injection molding may be called insert molding. The used thermoplastic resin was ABS (acrylonitrile-butadiene-stylene) resin.

Thereafter the polarizable electrodes 1 were impregnated in vacuo with an electrolytic solution of a 41 wt % sulfuric acid aqueous solution, and this is an element of electric double-layer capacitor consisting of a pair of opposed polarizable electrodes holding electrolytic solution between them. The capacitor element was packed in an ABS vessel 9a injection-molded separately to make an electric double-layer capacitor of a rated voltage of 1 V shown in FIG. 6. Integration with ABS vessel 9a was conducted with an adhesive. In the ABS vessel 9a there was provided with a partition 11 standing erect from the bottom for preventing short circuit between the opposed polarizable electrodes. Further there was an electrolytic solution inlet 12 for injection of electrolytic solution. The electric double-layer capacitor of a rated voltage of 1 V consisting of one element shown in FIG. 6 had a capacitance of 2920 F, an equivalent series resistance of $0.1\Omega$, and an external dimensions of $12\times7\times1.8$ cm$^3$. Suitable substance for making the vessel include polypropylene and high-density polyethylene. Besides it is possible to fabricate into an integrated electric double-layer capacitor comprising a plurality of capacitor elements interconnected in series, such as one illustrated in FIG. 2, as well as a single cell electric double-layer capacitor consisting of one capacitor element. In the case of using a sulfuric acid solution as an electrolytic solution, there may be provided in the vessel a catalyst stopper for provoking reaction between oxygen and hydrogen generated in some amounts, and thereby higher safety can be ensured. It is effective against possible too high inside pressure to install a safety valve at the electrolytic solution inlet.

EXAMPLE 11

Phenolic activated carbon powder and phenolic resin powder of Example 1 were mixed to have values of ratio by weight as given in Table 3. Methyl collosolne as a solvent is added to the mixed powder to make a paste mixture having a viscosity of 30,000 to 40,000 cm-poise measured by E-type viscometer. The paste mixture was printed through a 325-mesh stainless steel screen on a carbon substrate to an area of $30\times15$ mm$^2$, hardened with heating at 150° C. in an oven for 30 minutes, then subjected to heat treatment in nitrogen atmosphere in an electric furnace for 2 hours at various temperatures shown in Table 3. The temperature-rising rate was 100° C./h. The thickness of the resulting film was 20 μm as measured by examination of its section with a scanning electron microscope. Each thick film was peeled away from the substrate and the resistivity and surface area were measured by the DC 4-terminal method and the BET method, respectively, the obtained results being shown in Table 3. Subsequently two thick films of the obtained activated carbon/polyacene composite were impregnated in vacuo with an electrolytic solution of 30 wt % sulfuric acid solution for one hour. This pair of the resulting polarization electrodes on the substrate were oppositely put together with their surfaces of the electrodes opposed on each other to sandwich a 30 wt % sulfuric acid aqueous solution-wetted polyethylene separator of 110 μm thick between them. The output carbon substrates had a gold foil adhere closely and was clipped by a metallic clip and connected to a lead wire. Subsequently the whole assembly was placed fixedly between polyvinyl chloride plates, and thus a single cell electric double-layer capacitor having been obtained. A constant voltage of 900 mV was applied between the electrodes of this single cell electric double-layer capacitor for one hour to charge it. Then while discharging at a constant electric current of 1 mA, time it takes for the voltage to fall from 540 mV to 450 mV was measure, from which the capacitance of this single cell electric double-layer capacitor was determined. For standardization of capacitance, the capacitances per unit volume obtained by division of the value of the capacitance by the appearing volume of the two electrodes are given in Table 3. In addition a constant current of one KHz, and 10 mA is allowed to flow through this electric double-layer capacitor, and during which the voltage appearing between the ends thereof was measured, from which the equivalent series resistance was determined.

TABLE 3

| No. | Mixing ratio (wt %) Active carbon | Mixing ratio (wt %) Resin | Heat treatment temperature °C. | Surface area m²/g | Resistivity $\Omega \cdot$ cm | Capacitor characteristic Capacitance F/cm³ | Capacitor characteristic ESR mΩ |
|---|---|---|---|---|---|---|---|
| 1 | 50 | 50 | 600 | 547.7 | $2.28 \times 10^{-1}$ | 42.6 | 48 |
| 2 | 50 | 50 | 700 | 577.5 | $3.34 \times 10^{-2}$ | 94.4 | 44 |
| 3 | 50 | 50 | 800 | 553.7 | $2.70 \times 10^{-2}$ | 85.2 | 52 |
| 4 | 50 | 50 | 900 | 541.6 | $1.90 \times 10^{-2}$ | 84.6 | 68 |
| 5 | 50 | 50 | 1000 | 337.9 | $1.32 \times 10^{-2}$ | 49.4 | 37 |
| 6 | 60 | 40 | 600 | 729.3 | $6.03 \times 10^{-2}$ | 90.7 | 109 |
| 7 | 60 | 40 | 700 | 888.2 | $3.16 \times 10^{-2}$ | 143.6 | 51 |
| 8 | 60 | 40 | 800 | 954.9 | $2.50 \times 10^{-2}$ | 170.3 | 42 |
| 9 | 60 | 40 | 900 | 792.5 | $1.78 \times 10^{-2}$ | 124.7 | 47 |

TABLE 3-continued

| No. | Mixing ratio (wt %) Active carbon | Mixing ratio (wt %) Resin | Heat treatment temperature °C. | Surface area m²/g | Resistivity Ω·cm | Capacitor characteristic Capacitance F/cm³ | Capacitor characteristic ESR mΩ |
|---|---|---|---|---|---|---|---|
| 10 | 60 | 40 | 1000 | 740.0 | $1.58 \times 10^{-2}$ | 113.4 | 38 |
| 11 | 70 | 30 | 600 | 832.1 | $2.00 \times 10^{-1}$ | 142.8 | 129 |
| 12 | 70 | 30 | 700 | 940.7 | $4.47 \times 10^{-2}$ | 166.0 | 63 |
| 13 | 70 | 30 | 800 | 999.3 | $3.79 \times 10^{-2}$ | 181.2 | 58 |
| 14 | 70 | 30 | 900 | 1010.4 | $3.12 \times 10^{-2}$ | 185.3 | 49 |
| 15 | 70 | 30 | 1000 | 911.3 | $2.24 \times 10^{-2}$ | 154.4 | 50 |

As apparent from Table 3, the equivalent series resistance is not much dependent on mixing ratio and heat treatment temperature of activated carbon/resin and small as tens mΩ. On the other hand, the capacitance per unit volume reaches a peak between 700° and 900° C. of heat treatment temperature, and showed values as much as twice or more than that of the conventional electric double-layer capacitor in which activated carbon powder was used.

Although a paste mixture can be made by using a water-soluble resol-type phenolic resin, the present phenonic resin powder is superior to that in view of stability of its viscosity.

Compaired the Table 3 with the Table 1, it is understandable that the Example 11 is superior to the Example 1 in view of the capacitance per unit volume and the equivalent series resistance. In the examples shown in the Table 3, the capacitance per unit volume show 42.6 F/cm³ or more while the equivalent series resistance shows 129 mΩ or less under the condition of no compression. Accordingly, in view of the capacitor characteristics in Table 3, the feature of the activated carbon/polyacene composite of these examples can be explained such that its capacitance per unit volume shows 40 F/cm³ or more and its equivalent series resistance shows 130 mΩ or less under the condition of no compression. In such case, its resistivity shows 0.228 Ω·cm or less while the ratio of the [H]/[C] is in the range of 0.01 to 0.2 which is the same range of the Example 1. Preferably, the mixed ratio of the activated carbon and the resin is selected to be 50/50 to 70/30 by weight and its heat treatment temperature should be selected in the range of 700° C. to 900° C. In those condition, the capacitance per unit volume increases to 84.6 F/cm³ or more and its equivalent series resistance decreases to 68 mΩ or less, and its resistivity becomes 0.05 Ω·cm or less while the ratio [H]/[C] is in the range of 0.02 to 0.14. Therefore, the activated carbon/polyacene composite of Table 3 can be featurized that the resistivity is 0.3 Ω·cm or less while the ratio of the [H]/[C] is in the range of 0.01 to 0.2, and preferably the resistivity is 0.05 Ω·cm or less while the ratio of the [H]/[C] is in the range of 0.02 to 0.14.

EXAMPLE 12

Phenolic activated carbon powder and phenolic resin powder of Example 1 were mixed to have a ratio of 50/50 by weight. Methyl cellosolve is added to the mixed powder to make a paste mixture having a viscosity of 30,000 to 40,000 cm-poise measured by E-type vicometer. The paste mixture obtained was printed through a 325-mesh stainless steel screen on a carbon substrate to an area of 30×15 mm², and hardened with heating at 150° C. in an oven for 30 minutes. Similar screen printing on this heat-hardened film, followed by thermal hardening, was tepeated the numbers of times given in Table 4. These were subjected to heat treatment at 700° C. in nitrogen atmosphere in an electric furnace for 2 hours. The temperature-rising rate was 100° C/h. The thicknesses of the resulting films were measured by examination of their sections with a scanning electron microscope, and given in Table 4. A specimen of single cell electric double-layer capacitor was made and the capacitance and equivalent series resistance of it were determined, the obtained results being given in Table 4.

As apparent from Table 4, the capacitance of the capacitor can be freely set by changing film thickness with number of screen printing times.

TABLE 4

| Number of print times | Film thickness μm | Capacitor characteristic Electrostatic Capacitance (F) | Capacitor characteristic ESR (mΩ) |
|---|---|---|---|
| 1 | 18.2 | 1.70 | 44 |
| 2 | 35.8 | 3.35 | 49 |
| 3 | 49.1 | 4.25 | 60 |
| 4 | 58.8 | 5.39 | 77 |

EXAMPLE 13

Phenolic activated carbon powder and phenolic resin powder of Example 1 were mixed to have a ratio of 50/50 by weight. Methyl cellosolve is added to the mixed power to make a paste mixture having a viscosity of 10,000 cm-poise or less measured by E-type viscometer. The mixture was spin-coated on a carbon substrate of 50 mm in diameter, and hardened with heating at 150° C. in an oven for 30 minutes. This heat-hardened film was again spin-coated, followed by similar heat-hardening, and subjected to heat treatment at 700° C. in nitrogen atmosphere in an electric furnace for 2 hours. The temperature-rising rate was 100° C./h. The thickness of the resulting film was 10.2 μm as measured by examination of their sections with a scanning electron microscope. Subsequently a specimen of single cell electric double-layer capacitor was made in the same way as in Example 11, and the capacitance and equivalent series resistance of it as similarly determined were 1.03 F/cm³ and 40 mΩ, respectively.

By a coating method according to the present invention comprising in sequence masking a part of the substrate, making an usual coating as with brash or roller, and then heat-hardening, it is possible to obtain thick films of activated carbon/polyacene composite having similar capacitor characteristics to those in Example 11.

EXAMPLE 14

Phenolic activated carbon powder and phenolic resin powder of Example 1 were mixed to have a ratio of 50/50 by weight. Methyl cellosolve is added to the mixed powder to make a paste mixture having a viscosity of 30,000 to 40,000 cm-poise measured by E-type viscometer. The paste mixture obtained was printed through a 325-mesh stainless steel screen to a circular area of 40 mm in diameter on one surface of a carbon substrate of 50 mm in diameter and 0.5 mm thick to be collector 2 as shown in FIG. 7A, and then hardened with heating at 150° C. in an oven for 30 minutes. Additionally a heat-hardened film on the both surfaces of a carbon sheet to be collector of 50 mm in diameter and 50 $\mu$m thick as shown n FIG. 7B in the same way as in FIG. 7A and subjected to heat treatment at 700° C. in nitrogen atmosphere in an electric furnace for 2 hours. The temperature-rising rate was 100° C./h. Subsequently onto the polarizable electrode 1-side surface of the collector 2, a gasket of 40 mm in diameter cut from a Teflon sheet of 50 mm in diameter was concentrically adhered with an adhesive for Teflon (referred to as 'FIG. 7A capacitor' element, hereinafter). The FIG. 7B assembly had a Teflon gasket 4 adhered on the each surface thereof (referred to as 'FIG. 7B capacitor' element). Those composite films were impregnated with an electrolytic solution of 30 wt % sulfuric acid aqueous solution in vacuo for one hour. Two FIG. 7A capacitor elements were laminated at the uppermost and lowermost, respectively, with their polarization electrode 1 facing inwards, and five FIG. 7B capacitor elements between the FIG. 7A capacitor elements with a 30 wt % sulfuric acid-wetted polyethylene separator 4 of 110 $\mu$m thick interposed between the adjacent capacitor elements, as illustrated in FIG. 8, and the Teflon gaskets and the carbon sheets were adhered together with an adhesive for the Teflon gaskets. The outer carbon substrates had each a gold foil adhered closely and was clipped with a metallic clip and connected to a lead wire. Subsequently the resulting laminate was placed fixedly between polyvinyl chloride plates, and thus a multi-cell electric double-layer capacitor was obtained. This electric double-layer capacitor was charged by applying a constant voltage of 5.0 V between both terminals of it for one hour. Then at a constant discharge current of 1 mA, time it took for the voltage to fall from 3.0 V to 2.5 V was measured, and from this value its electrostatic capacitance of 0.25 F was determined. Besides from the voltage between the terminals measured at a constant current of 1 kHz and 10 mA, its equivalent series resistance of 0.22$\Omega$ was obtained.

EXAMPLE 15

Figure 9:
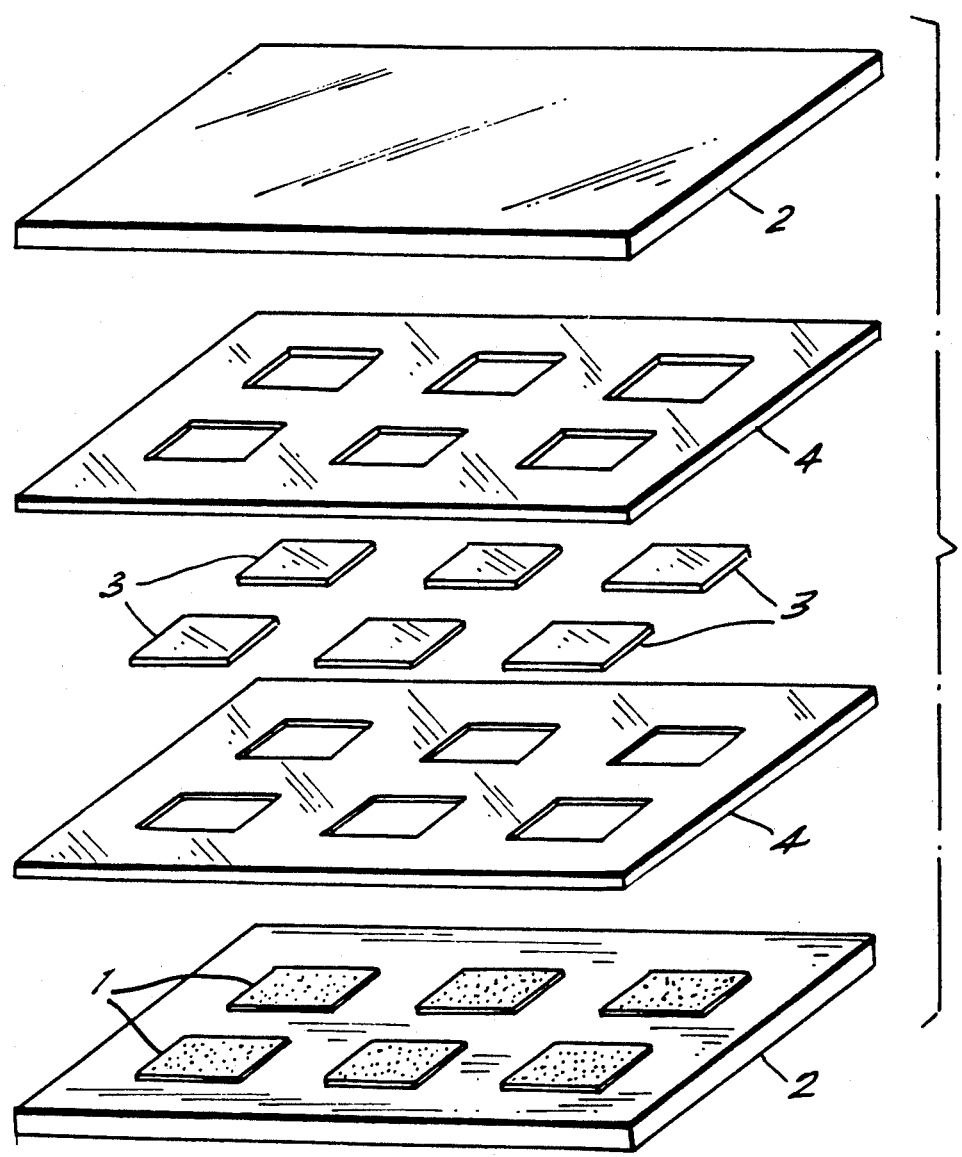
FIG. 9 is views for illustrating stepwise the process of making an electric double-layer capacitor described in Example 15.
Figure 10:
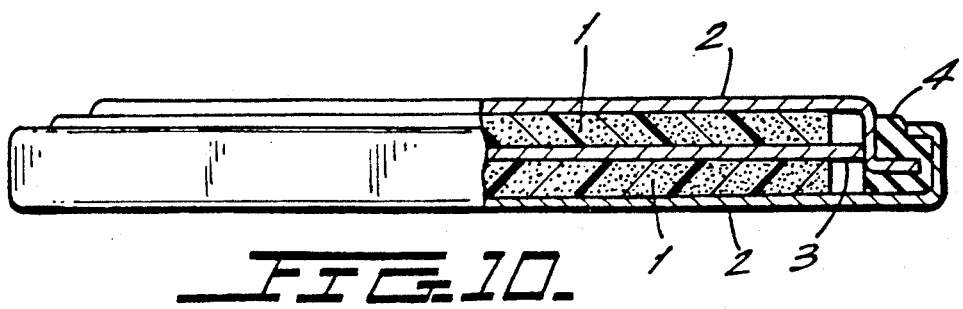
FIG. 10 is a cross-sectional view of the electric double-layer capacitor described in Example 16.

On a carbon substrate of 100×70 mm$^2$ and 0.5 mm thick, six square patterns of 20×20 mm$^2$ were simultaneously printed as shown in FIG. 9 with the same paste and in the same way as in Example 14. The printed carbon substrate was subjected to heat hardening at 150° C. in an oven for 30 minutes, followed by heat treatment at 700° C. in nitrogen atmosphere in an electric furnace for 2 hours in the same way as in Example 14. Besides a gasket sheet 4 of butyl rubber having the correspondent to those printed square patterns cut out was fitted with a phenolic resin adhesive on the carbon substrate. A 30 wt % sulfuric acid aqueous solution was dropped on the thick film of an activated carbon/polyacene composite to be polarization electrode 1, and then the whole substrate was placed in vacuo to impregnate the polarizable electrode with the electrolytic solution. A pair of the resultants was integrated with separators arranged between them as shown in FIG. 1 by vulcanization-adhering the respective gaskets 4 together to seal the whole, and cut with a dicing saw into six sections each of electric double-layer capacitor having the same cross-section as shown in FIG. 1. The thus-obtained electric double-layer capacitor had an electrostatic capacitance of 1.5 F and an equivalent series resistance of 0.03$\Omega$ as determined in the same way as in Example 14.

EXAMPLE 16

Phenolic resin solution 40 parts was weighed and dissolved in methyl cellosolve. To this, phenolic activated carbon powder 60 parts weighed was added and mixed into a paste to have a viscosity of 30,000 to 40,000 cm-poise. With this paste, an oxidation-resistant stainless substrate of 100×70 mm$^2$ and 0.3 mm thick was printed through a 325-mesh stainless steel screen, and subjected to heat hardening at 150° C. in an oven for 30 minutes, followed by heat treatment at 800° C. in nitrogen atmosphere in an electric furnace for 2 hours. The temperature-rising rate was 100° C./h. The produced film had a thickness of about 30 $\mu$m as measured with a scanning electron microscope. The resultant metal substrate with a thick activated carbon/polyacene composite film, which is to be formed into a polarizable electrode 1 to 16 mm in diameter, had two discs of 23 mm and 18.5 mm, respectively, cut concentrically with the printed pattern. The discs were worked by curving the edge thereof into dish-shape. The polarizable electrode 1 area was impregnated in vacuo with an electrolytic solution of propylene carbonate in 1 mol/liter tetraethylammonium tetrafluoroborate (C$_2$H$_5$)$_4$NBF$_4$ dropped to there. These resulting discs were assembled so that their polarizable electrodes were opposed with a separately-impregnated polyethylene separator 3 of 110 $\mu$m thick sandwiched between them. Then clinching was carried out to make sealing between the metallic dishes of different sizes by intermediation through gasket 4.

The electric double-layer capacitor obtained in this Example has a coin-shape of 20 mm in diameter and 0.8 mm in thickness.

Subsequently the electrostatic capacitance and equivalent series resistance of the electric double-layer capacitor were determined as follows: After charging by application of a constant voltage of 2.5 V between both terminals for 1 hour, time it took for the voltage to fall from 3.0 V to 2.5 V was measured at a constant discharge current of 1 mA, and the voltage between the terminals at a constant current of 10 mA and 1 kHz. From these values, an electrostatic capacitance of 0.1 F and an equivalent series resistance of 10$\Omega$ were obtained.

Like this Example, similar electric double-layer capacitors can be made by the use of metals such as nickel, copper, and gold, and alloys such as Inconel.

As described above, the present invention can provide electrodes as material for a thin, small-size electric double-layer capacitor having twice or more increased capacitance per volume and reduced equivalent series resistance, and capacitance-controllable in wider range, compared with the conventional electric double-layer capacitors in which activated carbon is used. Further it offers thin miniaturized electric double-layer capacitors which utilize thick activated carbon/polyacene composite serving as polarizable electrodes and incorporating collectors integrally, thus the equivalent series resistance being small. In addition it provides sealing technique and manufacturing process suitable as electronic parts for mass production.

The embodiments of the present invention described above are summarized as follows:

(1) An activated carbon/polyacene composite made by heat treatment of a mixture of activated carbon powder or fiber and granular or powdery phenole-formaldehyde resin containing carbon atom [C] and hydrogen atom [H] in a molar ratio range of $$0.01 \leq [H]/[C] \leq 0.2.$$

(2) A process of making the activated carbon/polyacene composite defined in the preceding (1) characterized by subjecting a mixture of activated carbon powder or fiber and granular or powdery phenole-formaldehyde resin to heat hardening and then heat treatment at up to 900° C. in non-oxidizing atmosphere.

(3) A process of making a thick activated carbon/polyacene composite film on a substrate characterized by comprising repeating at least once a cycle to obtain a desired thickness of the film, the cycle consisting of applying a paste mixture of activated carbon powder, granular or powdery phenole-formaldehyde resin and methyl cellosolve in the form of film onto the surface of the substrate by the screen printing method or the spin coating method and then hardening the film by heating it in a non-oxidizing atmosphere.

(4) An electric double-layer capacitor defined in the previous (1) characterized by a pair of electrolytic solution-impregnated, polarizable electrodes opposed through a nonconducting and pervious-to-ion separator between them.

(5) An electric double-layer capacitor characterized by using liquid-impermeable compact carbon material or carbon-containing rubber or plastic, or conducting ceramic as of borate, carbide or nitride as at least one of collectors, terminal electrodes, and connection conductors.

(6) An electric double-layer capacitor characterized in that polarizable electrode (s) and a collector are electrically interconnected using a conducting adhesive, by means of fitting mechanism, or by thermal pressing with porous carbon block of polarizable electrodes if collector is of carbon-containing plastic or rubber.

(7) An electric double-layer capacitor characterized by using a polarizable electrode a thick activated carbon/polyacene composite film made by depositing in the form of film a mixture of activated carbon powder and granular or powdery phenole-formaldehyde resin and methyl cellosolve onto one or both surfaces of a conducting substrate or sheet to be a collector, and subjecting the film to heat hardening and heat treatment in an non-oxidizing atmosphere.

(8) A multiple electric double-layer capacitor characterized by arranging at least two capacitor elements each consisting of a conducting substrate and a polarizable electrode on each surface thereof between a pair of modified capacitor elements each consisting of a conducting substrate and a polarizable electrode at one surface thereof through separators between the adjacent polarizable electrodes, and connecting in series these capacitor elements to common collectors.

(9) An electric double-layer capacitor defined in the previous (7) characterized by using a gasket of plastic or rubber as the sealing gasket to hermetically adhere it to the substrate.

(10) A process of making at least one electric double-layer capacitors at a time characterized by forming at least one pattern to be polarizable electrode on a conducting substrate or sheet, adhering hermetically a gasket to the substrate, the gasket having the corresponding holes in position to the patterns thereof, opposing the polarizable electrode formed into the same pattern on another substrate or sheet through the intermediation of a separator, adhering hermetically the gaskets and the substrates together, and then cutting the assembly into sections.

(11) An electric double-layer capacitor defined in the previous (7) integrated on the metal substrate characterized by clinching hermetically the edge of the metal substrates through intermediation of a gasket.

(12) An electric double-layer capacitor defined in the preceding (11) characterized by forming at least one pattern to be polarizable electrode on an oxidation-resistant metal substrate by screen printing, subjecting the patterns to heat hardening and then heat treatment at a time to make a plurality of polarizable electrodes, cutting out the resulting patterns each together with the peripheral margin thereof to be clinched, and making each pair of the cut out polarizable electrodes opposed with a gasket sandwiched therebetween and clinching hermetically the metal substrate through the intermediation of a gasket.

(13) An electric double-layer capacitor characterized in that parts of the collector and the polarizable electrode are integrated with a thermoplastic vessel s a part thereof when molded by the injection molding.

What is claimed is:

1. An activated carbon/polyacene composite containing activated carbon powder or fiber and having a selected molar ratio range of hydrogen atoms [H] to carbon atoms [C] as follows:

$$0.01 \leq [H]/[C] \leq 0.2,$$

wherein the resistivity of the composite is less than 1.4 $\Omega$-cm under a condition of no compression.

2. The activated carbon/polyacene composite according to claim 1, wherein said molar ratio is selected to be from 0.02 to 0.14 and said resistivity thereof is selected to be lower than 0.21 $\Omega$-cm.

3. An electric double-layer capacitor comprising a pair of polarizable electrodes which comprise the activated carbon/polyacene composite of claim 1.

4. The electric double-layer capacitor according to claim 3, wherein a capacitance per unit volume is selected to be 7.7 F/cm$^3$ or more and an equivalent series resistance is selected to be 2.51 cm or less under a condition of no compression.

5. The electric double-layer capacitor according to claim 3, wherein said pair of polarizable electrodes are impregnated with an electrolytic solution containing tetraethylammonium tetrafluoraborate $(C_2H_5)_4NBF_4$.

6. The electric double-layer capacitor according to claim 3, wherein said pair of polarizable electrodes are impregnated with an electrolytic solution of sulfuric acid.

7. A process for producing activated carbon/polyacene composite comprising the steps of: mixing activated carbon powder or fiber and a phenole-formaldehyde resin powder to provide a mixture of them; and subjecting said mixture to heat treatment in nonoxidizing atmosphere within a range of 600° to 1000° C. which is insufficient to reach full carbonization of said phenole-formaldehyde resin.

8. The process according to claim 7, wherein said mixture is of a paste mixture having a solvent of said phenole-formeldehyde resin, and a step of forming a film of said paste mixture on a substrate by screen printing or spin coating is carried out before said heat treatment.

9. The process according to claim 7, wherein a ratio range of said activated carbon to said phenole-formaldehyde resin of said mixture is selected to be 50/50 to 70/30 by weight.

10. A process for producing activated carbon/polyacene composite comprising the steps of: mixing activated carbon powder or fiber and a thermosetting resin powder to provide a mixture of them; and subjecting said mixture to heat treatment in nonoxidizing atmosphere within a temperature range which is insufficient to reach full carbonization of said thermosetting resin; wherein said thermosetting resin is phenole-formaldehyde resin, and said heat treatment temperature is within a range of 700° to 900° C.

11. A process for producing an activated carbon/polyacene composite comprising the steps of: mixing phenolic activated carbon powder and phenole-formaldehyde resin powder to provide a mixture of them such that a ratio of said carbon powder to said resin powder is selected to be 50/50 to 70/30 by weight; and heating said mixture in nonoxidizing atmosphere at a temperature range of 700° to 900° C. for two hours.

12. An activated carbon/polyacene composite produced by the process of claim 10.

13. An activated carbon/polyacene composite containing activated carbon powder or fiber and a phenole-formaldehyde resin powder and having a selected molar ratio range of hydrogen atoms [H] to carbon atoms [C] as follows:

$$0.01 \leq [H]/[C] \leq 0.2.$$

14. The activated carbon polyacene composite according to claim 13, wherein said activated carbon powder or fiber and thermosetting resin powder are subjected to heat treatment in non-oxidizing atmosphere within a range of 600° to 1,000° C. which is insufficient to reach full carbonization of said phenole-formaldehyde resin.

15. The activated carbon polyacene composite according to claim 14, wherein said heat treatment temperature is within a range of 700° to 900° C.

16. An electric double-layer capacitor comprising a pair of polarizable electrodes which comprise the activated carbon/polyacene composite of claim 14.

17. The electric double-layer capacitor according to claim 16, wherein a capacitance per unit volume is selected to be 7.7 F/cm$^3$ or more and an equivalent series resistance is selected to be 2.51 or less under a condition of no compression.

* * * * *